United States Patent
Rogers et al.

(10) Patent No.: US 11,460,362 B2
(45) Date of Patent: Oct. 4, 2022

(54) FLEXIBLE PRINTED PRESSURE TRANSDUCER WITH SENSOR DIFFUSION STACK MATERIALS AND METHODS INCORPORATING THE SAME

(71) Applicant: Toyota Motor Engineering & Manufacturing North America, Inc., Plano, TX (US)

(72) Inventors: Caleb M. Rogers, Lexington, KY (US); Benjamin D. Atkinson, Lexington, KY (US); Tyler Flood, Stamping Ground, KY (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 232 days.

(21) Appl. No.: 16/519,594

(22) Filed: Jul. 23, 2019

(65) Prior Publication Data
US 2021/0025772 A1  Jan. 28, 2021

(51) Int. Cl.
*G01L 5/16* (2020.01)

(52) U.S. Cl.
CPC ..................... *G01L 5/16* (2013.01)

(58) Field of Classification Search
CPC .................... G01L 5/16; G01L 1/205
See application file for complete search history.

(56) References Cited

U.S. PATENT DOCUMENTS 4,497,989 A * 2/1985 Miller .................. H01H 3/141
  200/86 R
4,933,589 A * 6/1990 Strubbe ............... H01L 41/1132
  340/674

(Continued)

FOREIGN PATENT DOCUMENTS

CN  103148969 A  6/2013
CN  103148977 A  6/2013

(Continued)

OTHER PUBLICATIONS

Zhenan Bao; "A Biomimetic Electronic Skin (e-skin) with Discriminating Forces"; Stanford University Office of Technology Licensing; pp. 1-3.

(Continued)

*Primary Examiner* — Tran M. Tran
(74) *Attorney, Agent, or Firm* — Dinsmore & Shohl LLP (57) ABSTRACT

A portable sensing apparatus includes an attachment mechanism to secure the portable sensing apparatus to an object, a communications module and a flexible sensor communicatively coupled to the communications module. The flexible sensor is configured to mechanically deform in accordance with a shape of the object and includes a pair of diffusion layers disposed between a pair of contact layers that distribute the force received along outer surfaces of the flexible sensor across the diffusion layers. The flexible sensor includes a sensing layer disposed between the diffusion layers. The diffusion layers normalize the force received from the contact layers across the sensing layer. The sensing layer receives the force at a plurality of locations across a surface area of the sensing layer to determine a resultant pressure applied to the flexible sensor, and the communications module transmits an electrical signal indicative of the resultant pressure to an external device.

19 Claims, 4 Drawing Sheets

(56) References Cited

U.S. PATENT DOCUMENTS

| | | | | |
|---|---|---|---|---|
| 5,695,859 A * | 12/1997 | Burgess | ............... | H01H 1/029 |
| | | | | 200/85 R |
| 5,825,119 A * | 10/1998 | Shibata | ............... | G01N 29/046 |
| | | | | 73/54.24 |
| 6,121,869 A * | 9/2000 | Burgess | ............... | H01H 3/141 |
| | | | | 200/511 |
| 8,033,189 B2 * | 10/2011 | Hayakawa | ............. | B25J 13/084 |
| | | | | 901/46 |
| 8,336,399 B2 * | 12/2012 | Muroyama | ............. | G01L 5/228 |
| | | | | 73/862.046 |
| 8,613,231 B2 * | 12/2013 | Muroyama | ............. | G01L 5/228 |
| | | | | 73/862 |
| 8,800,386 B2 * | 8/2014 | Taylor | ............... | G01L 1/18 |
| | | | | 73/862.044 |
| 9,116,569 B2 * | 8/2015 | Stacy | ............... | G06F 3/0446 |
| 9,125,595 B2 * | 9/2015 | Clarke | ............... | A43B 3/0005 |
| 9,417,693 B2 * | 8/2016 | Seth | ............... | G06F 3/017 |
| 9,778,131 B2 * | 10/2017 | Everett | ............... | A61B 5/6833 |
| 9,863,823 B2 * | 1/2018 | McMillen | ............... | G01L 1/06 |
| 10,126,153 B2 * | 11/2018 | Bischoff | ............... | G01L 1/16 |
| 10,175,126 B2 * | 1/2019 | Araki | ............... | G01L 1/16 |
| 10,318,089 B2 * | 6/2019 | Smith | ............... | G01L 1/205 |
| 10,729,067 B2 * | 8/2020 | Hammer | ............... | A01D 41/127 |
| 10,942,071 B2 * | 3/2021 | Sadri | ............... | B62D 65/06 |
| 10,959,644 B2 * | 3/2021 | Reese | ............... | A61B 5/1038 |
| 11,131,589 B2 * | 9/2021 | Shih | ............... | G01P 15/09 |
| 2007/0193361 A1 * | 8/2007 | Coffey | ............... | G01L 5/243 |
| | | | | 73/780 |
| 2014/0350882 A1 | 11/2014 | Everett et al. | | |

FOREIGN PATENT DOCUMENTS

| | | |
|---|---|---|
| CN | 104406722 A | 3/2015 |
| CN | 107894293 A | 4/2018 |
| KR | 20180113081 A | 10/2018 |
| WO | 2018213937 A1 | 11/2018 |

OTHER PUBLICATIONS

Extended European search report for European Patent Application No. EP20187490.6, dated Dec. 1, 2020.

Communication pursuant to Article 94(3) EPC for European Patent Application No. EP20187490.6, dated Mar. 17, 2022.

* cited by examiner

FLEXIBLE PRINTED PRESSURE TRANSDUCER WITH SENSOR DIFFUSION STACK MATERIALS AND METHODS INCORPORATING THE SAME

TECHNICAL FIELD

The present specification generally relates to sensor systems and processes for detecting and measuring a pressure applied to a sensor, and more specifically, to a flexible sensor stack design incorporating distribution and diffusion materials of varying densities for conveying an applied-force across a sensor to determine a resultant force.

BACKGROUND

Sensors may be utilized to collect pressure measurements applied thereto. Generally, sensor technology is incorporated into various apparel items that are to be positioned along an operator's body at locations that are likely to encounter a force. The apparel items, such as gloves positioned over an operator's hands and footwear positioned over an operator's feet, may include sensor technology embedded therein to collect representative pressure measurements when a force is received at said location. To improve an accuracy of the pressure measurements detected by a sensor, a size, geometry and/or position of the sensor may be selectively manipulated relative to a predetermined task to be performed by an operator. In instances where a predetermined task may generally involve encountering physical forces at various angles relative to the sensor (e.g., due to a natural curvature of an operator's hands or feet, or an inherent shape of the physical object being encountered by an operator), a physical force applied thereto may be received in a non-perpendicular direction relative to a planar surface of the sensor. Accordingly, a determination of a resultant pressure measurement may include inaccuracies due to the angle of the force received at the sensor. The potential inaccuracy in measuring the detected pressure at the sensor may be detrimental to the objective of identifying the magnitude of force received thereon.

SUMMARY

In one embodiment, a portable sensing apparatus for measuring a force includes an attachment mechanism configured to secure the portable sensing apparatus to an object, a communications module, and a flexible sensor communicatively coupled to the communications module. The flexible sensor is configured to mechanically deform in accordance with a shape of the object. The flexible sensor includes a pair of contact layers and a pair of diffusion layers disposed between the pair of contact layers. The pair of contact layers distribute the force received along outer surfaces of the flexible sensor across the pair of diffusion layers. The flexible sensor includes a sensing layer disposed between the pair of diffusion layers. The pair of diffusion layers normalize the force received from the pair of contact layers across the sensing layer. The sensing layer receives the force at a plurality of locations across a surface area of the sensing layer to determine a resultant pressure applied to the flexible sensor, and the communications module transmits an electrical signal indicative of the resultant pressure to an external device.

In another embodiment, a method includes positioning a portable apparatus against an exterior surface of an object, deforming a shape of the portable apparatus in accordance with a shape of the object, and attaching the portable apparatus to the object. The method includes receiving a force applied to the object along a flexible sensor of the portable apparatus, distributing the force applied to the flexible sensor of the portable apparatus to a plurality of locations across an outer-contact layer of the flexible sensor, and receiving the forces from the plurality of locations across the outer-contact layer at a plurality of locations along an outer-diffusion layer of the flexible sensor. The outer-diffusion layer is disposed beneath the outer-contact layer relative to the force received thereon. The method includes normalizing the forces through the outer-diffusion layer at the plurality of locations across the outer-diffusion layer, and receiving the forces across a sensing layer of the flexible sensor. The sensing layer is disposed beneath the outer-contact layer and the outer-diffusion layer relative to the force received thereon.

In another embodiment, a deformable apparatus includes an attachment mechanism configured to secure the deformable apparatus to an object, a communications module, and a flexible sensor communicatively coupled to the communications module. A shape of the flexible sensor is selectively adjustable relative to a shape of the object. The flexible sensor includes an outer layer configured to receive a force applied to the object along the deformable apparatus. The outer layer is further configured to distribute the force and normalize the distributed force therethrough. The flexible sensor includes an inner layer positioned adjacent to the outer layer and configured to receive a normal force in response to the outer layer receiving the force. The inner layer is further configured to distribute the normal force and normalize the distributed normal force therethrough. The flexible sensor includes a sensing layer disposed between the outer layer and the inner layer. The sensing layer is configured to receive the normalized force from the outer layer and the normalized normal force from the inner layer to detect a resultant magnitude of the force received along the object. The sensing layer transmits an electrical signal indicative of the resultant magnitude to the communications module, and the communications module transmits the electrical signal to an external device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Sensing apparatuses may include one or more arrays (e.g., regions) of sensor assemblies designed to collectively detect a force received along the apparatus. By detecting a physical force applied to the sensor arrays, an operator of the sensing apparatus may identify a resultant pressure endured at various locations along the apparatus. The sensing apparatus may be a portable device that is sized and shaped to be selectively positioned, and more particularly attached, along various surfaces of an object in which a force is likely to be received on. Further, the sensing apparatus may be configured to flexibly deform in response to a physical deformation of the apparatus in accordance to a curvature of the various surfaces of the object in which the sensing apparatus is attached thereto. With the sensing apparatus secured to the object along a surface that is to receive a force thereon, and the pressure data effectively detected by the sensor assemblies of the sensing apparatus when the force is received on the object, an operator of the apparatus may adjust a manner in performing a task to increase various efficiencies (e.g., adjusting a physical position, geometry, and/or orientation of an operator's hand, foot, etc.). In particular, as a result of analyzing said data an operator may proactively minimize the force endured along an operator's body and reduce instances of possible injury, discomfort, and/or unnecessary-expended labor when performing the task.

To determine an appropriate method to perform a task, based on the forces applied to an operator's body when performing the task, accurately measuring a resultant pressure is desirable. However, in some instances a resultant pressure measurement may vary relative to an actual force received along an operator's body due to the varying angles in which the force may be received along a palmar surface of the operator's hand or feet, and/or a planar surface of the sensor assembly. Inaccuracies of measuring a force vector may provide challenges in accurately measuring a resultant pressure applied to an operator's body and in determining an appropriate method in performing a task by the operator.

The present disclosure relates generally to portable sensing apparatuses and methods that include sensor technology for detecting and measuring forces received along an object that the portable sensing apparatus is secured to. More specifically, the present disclosure relates to sensor assemblies of a portable sensing apparatus and methods that improve an accuracy of measuring a pressure received along the sensor assembly of the sensing apparatus by including a plurality of layers of varying materials disposed about a core sensor layer of the sensor assembly. The plurality of layers disposed about the core sensor layer is particularly configured to distribute and normalize a force received along the sensor assembly. Providing a sensing system that distributes a force across a core sensor layer may assist in accurately measuring a resultant pressure calculated from a force applied thereto, and in particular forces having an angled orientation relative to a surface of the object that the sensing apparatus is secured to. The portable sensing apparatus may aid in determining an appropriate method, such as a physical position or orientation, in performing a task by detecting and measuring various forces received by an operator's body (e.g., hand, foot, etc.) at varying angles relative to a palmar surface of the operator's body with accuracy by distributing and diffusing the force across the plurality of layers of the portable sensing apparatus for accurate detection.

Figure 1:
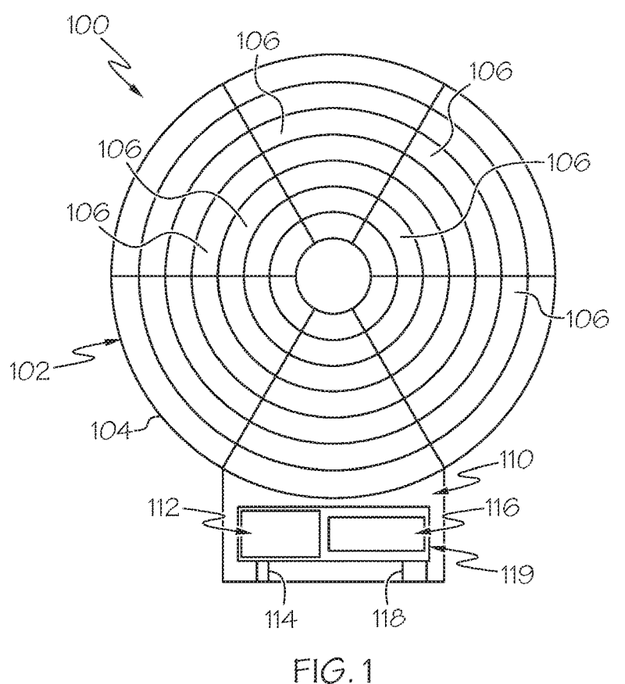
FIG. 1 schematically depicts an illustrative portable sensing apparatus including a plurality of sensors in a circular configuration according to one or more embodiments shown and described herein.

Referring now to the drawings, FIG. 1 depicts an illustrative portable sensing apparatus 100 including a surface region 102 and a control module 110. The surface region 102 of the portable sensing apparatus 100 includes a circular configuration that is sized and shaped to receive a sensor array 104 disposed thereon. In the present example, the surface region 102, and the sensor array 104 positioned along the surface region 102, has a diameter ranging from about 50 millimeters to 150 millimeters, and in some embodiments about 60 millimeters. It should be understood that a size (i.e. diameter) of the sensor array 104 extending along the surface region 102 may vary in accordance to various factors, such as, for example, a size of an object that the portable sensing apparatus 100 is to be secured to, a surface curvature at a location of the object that the portable sensing apparatus 100 is to be attached at, and/or an application of use of the portable sensing apparatus 100. Furthermore, and as will be described in greater detail herein, the surface region 102 of the portable sensing apparatus 100 may include the surface region 102 and/or the sensor array 104 having various other shapes or configurations than those shown and described herein, such as, for example, a square or rectangular-shaped sensor array (see FIGS. 3-4). Although the sensor array 104 is shown and described in the embodiments herein as having a substantially similar shape as the surface region 102 that the sensor array 104 is disposed along, it should be understood that in other embodiments the sensor array 104 may include a different shape relative to the surface region 102.

The sensor array 104 may be secured, and more specifically fixedly attached, to the surface region 102 of the portable sensing apparatus 100 by various methods, including, but not limited to, printing the sensor array 104 onto the surface region 102, weaving the sensor array 104 through the surface region 102, adhesively securing the sensor array 104 to the surface region 102, and/or the like. In some embodiments, the portable sensing apparatus 100 includes an attachment mechanism positioned along a surface opposite of the surface region 102. For example, the attachment mechanism may comprise an adhesive that may be selectively exposed by an operator of the portable sensing apparatus 100 for securely fixing the portable sensing apparatus 100 to the surface of the object. It should be understood that additional and/or fewer sensor arrays 104 may be positioned along the surface region 102 than those shown and depicted herein without departing from the scope of the present disclosure. It should further be understood that in other embodiments the portable sensing apparatus 100 may include additional surface regions 102 with one or more sensor arrays 104 positioned thereon.

Still referring to FIG. 1, the sensor array 104 positioned along the surface region 102 of the portable sensing apparatus 100 includes a plurality of sensing regions 106. The plurality of sensing regions 106 of the sensor array 104 are sized, shaped and positioned along the surface region 102 relative to a circular configuration of the sensor array 104. Additionally, the plurality of sensing regions 106 of the sensor array 104 are sized, shaped and positioned along the surface region 102 relative to an intended-task to be performed along an object (not shown) that the portable sensing apparatus 100 is to be secured to. In other words, a location and profile of the plurality of sensing regions 106 along the sensor array 104 may be determined based on a predetermined use of the object receiving the portable sensing apparatus 100. Accordingly, the sensor array 104 is sized and shaped in accordance with a surface of an object that the portable sensing apparatus 100 is to be positioned on, wherein said surface of the object generally receives a force load thereon when an operator performs the predetermined task.

As will be described in greater detail herein, the portable sensing apparatus 100 may be positioned along an exterior region of an object having various surface curvatures. The surface region 102 of the portable sensing apparatus 100 may be positioned along an object at locations where a static, push load may be received during performance of a predetermined task. The surface region 102 of the portable sensing apparatus 100 may further be positioned along portions of an object where transverse, slidable loads may be received that generate indirect forces thereon. Accordingly, the portable sensing apparatus 100, and in particular the sensor array 104, is configured to flexibly deform in response to a mechanical deformation of the surface region 102 by an operator of the portable sensing apparatus 100. In other words, the sensor array 104 of the portable sensing apparatus 100 is formed of a material that is operable to facilitate a physical adjustment or manipulation of a configuration of the surface region 102. In this instance, an operator of the portable sensing apparatus 100 may selectively adjust a shape and/or profile of the sensor array 104 in accordance with a surface curvature of an object. Further, a material composition of the plurality of sensing regions 106 of the sensor array 104 may vary relative to one another along the surface region 102. For example, materials providing a reduced and/or enhanced rigidity for the sensing region 106 along the surface region 102 may be selectively included in the sensor array 104 to thereby increase and/or decrease a flexibility of the surface region 102 by an operator of the portable sensing apparatus 100. Additionally, a material thickness of the plurality of sensing regions 106 of the sensor array 104 may vary along the along the surface region 102 to provide sufficient maneuverability for the portable sensing apparatus 100 to conform to a surface curvature of an object.

Still referring to FIG. 1, in the present example the sensor array 104 of the surface region 102 includes a circular configuration such that the portable sensing apparatus 100 is sized and shaped to be received along a region of an object having a planar, round, and/or arched surface. The plurality of sensing regions 106 of the sensor array 104 include larger sensing regions 106 extending about an outer, perimeter portion of the surface region 102 relative to an inner, center portion of the surface region 102. Further, the plurality of sensing regions 106 of the circular sensor array 104 extend along the surface region 102 in a circular orientation about the inner, center portion of the surface region 102. More particularly, the plurality of sensing regions 106 located along the surface region 102 are sized and shaped as segmented portions of the circular sensor array 104. However, it should be understood that the plurality of sensing regions 106 of the circular sensor array 104 may include various other shapes, sizes and configurations than those shown and described herein. As also briefly described above, the sensor array 104 and/or the surface region 102 of the portable sensing apparatus 100 may further include various other shapes, sizes and configurations than the circular configuration of the surface region 102 and the sensor array 104 of the present example (see FIGS. 3-4).

In the present example, the plurality of sensing regions 106 of the sensor array 104 are sized and shaped with substantially similar geometries relative to an adjacent sensing region 106 along the surface region 102. In other embodiments, depending on a predetermined use of the portable sensing apparatus 100 and/or a relative surface curvature of the object on which the portable sensing apparatus 100 is to be secured to, adjacent sensing regions 106 of the plurality of sensing regions 106 may include geometries that are distinct from one another. In other words, a profile of each of the plurality of sensing regions 106 included in the sensor array 104 along the surface region 102 may be determined based on a physical profile of an object in which an operator of the portable sensing apparatus 100 is to secure the portable sensing apparatus 100 to. It should be understood that a size of a sensing region 106 is determinative of a performance of the sensing region 106, and in particular an accuracy of measuring a force load received thereon. Accordingly, the sizes of each of the plurality of sensing regions 106 along the surface region 102 may be adjusted in accordance with a predetermined accuracy threshold for the sensor array 104 of the portable sensing apparatus 100.

Still referring to FIG. 1, the control module 110 of the portable sensing apparatus 100 is communicatively coupled to the plurality of sensing regions 106 of the sensor array 104. In particular, the control module 110 is attached to the surface region 102 and, more specifically, includes an interconnecting portion (not shown) that is coupled to a corresponding interconnecting portion (not shown) of the sensor array 104. Although not shown, it should be understood that the control module 110 may be attached to the surface region 102 via various fastening devices, such as, for example, one or more dowel pins extending from either the interconnecting portion of the control module 110 or the surface region 102 and received within the corresponding interconnecting portion of the opposing component of the portable sensing apparatus 100.

With the control module 110 attached to the surface region 102 and coupled to the sensor array 104 via the corresponding interconnecting portions, respectively, one or more components of the control module 110 are in communication with the plurality of sensing regions 106. Although not shown, it should be understood that an interconnecting portion of the sensor array 104 may generally include one or more connectors that extend from a coupling interface of the surface region 102, such as, for example, along a side of the surface region 102. The one or more connectors of the sensor array 104 are communicatively coupled to the plurality of sensing regions 106 of the sensor array 104 and extend outwardly from the coupling interface of the surface region 102 to facilitate a connection of the sensor array 104 to one or more devices, such as, for example, the control module 110.

Although not shown, it should further be understood that an interconnecting portion of the control module 110 may generally include one or more interconnectors configured to receive and couple to the one or more connectors of the sensor array 104. The one or more interconnectors of the control module 110 may extend from a corresponding coupling interface of the control module 110, such as, for example, along a side of the control module 110. The one or more interconnectors of the control module 110 are communicatively coupled to one or more components of the control module 110 to facilitate a connection of said components to the sensor array 104 when the coupling interfaces of the control module 110 and the surface region 102 are connected. It should be understood that various other mechanisms or systems for communicatively coupling the sensor array 104 and the control module 110 may be included in the portable sensing apparatus 100 without departing from the scope of the present disclosure.

Still referring to FIG. 1, the control module 110 of the portable sensing apparatus 100 includes a power module 112 and a computer module 116 encapsulated therein. The power module 112 may comprise various systems, devices, and/or apparatus capable of storing, generating, and/or dispensing electrical energy to the other components of the portable sensing apparatus 100 (e.g., the sensor array 104, the computer module 116, and the like). In the present example, the power module 112 comprises a battery disposed within the control module 110 for providing an internal power source. The control module 110 further includes a direct DC power inlet 114 for coupling the portable sensing apparatus 100 to an external power source (not shown). The DC power inlet 114 is coupled to the power module 112 (e.g., battery) of the control module 110. In this instance, the portable sensing apparatus 100 is operable to receive power from an internal source (i.e., the power module 112) and an external source (i.e., through the DC power inlet 114). In some embodiments, the battery of the power module 112 is a rechargeable battery that may be recharged by an external power source through the DC power inlet 114.

The computer module 116 of the control module 110 is in the form of a printed-circuit board (PCB) configured to mechanically support and electrically connect the electronic components of the control module 110 and the sensor array 104 to an external device communicatively coupled thereto. In the present example. The computer module 116 facilitates communication between the portable sensing apparatus 100 and an external device (e.g., mobile device, remote server/computer, tablet, etc.). In some embodiments, the computer module 116 is communicatively coupled to an external device (not shown) through a wired-connection. As will be described in greater detail herein, the control module 110 further includes a port 118 such that the computer module 116 may interconnect the portable sensing apparatus 100 to an external device through a wired-connection via the USB port 118. In other embodiments, the computer module 116 is communicatively coupled to an external device through a wireless-connection. In this instance, the computer module 116 may include a Wi-Fi' system and/or Bluetooth™ system therein depending on a power usage requirement of the portable sensing apparatus 100.

For example, in embodiments where the portable sensing apparatus 100 requires higher power usage during communications, the computer module 116 of the control module 110 may include a Wi-Fi system that utilizes a clock frequency of 5.0 gigahertz (Ghz) for communications at a data rate of less than 54 megabits per second (Mbps). In other embodiments, where the portable sensing apparatus 100 requires lower power usage during communications, the computer module 116 of the control module 110 may include a Bluetooth system that utilizes Bluetooth low energy (BLE) 5.0 at a clock frequency of 2.5 gigahertz (Ghz) for communications at a data rate of about 1.0-3.0 megabits per second (Mbps). It should be understood that the clock frequencies and data rates described herein are provided for illustrative purposes only such that the Wi-Fi system and Bluetooth system of the computer module 116 may include various other communication speeds.

Still referring to FIG. 1, power to the printed circuit board of the computer module 116 may be provided from the battery of the power module 112, an external power source coupled to the control module 110 through the DC power inlet 114, and/or an external power source coupled to the control module 110 through a USB port 118 of the control module 110. In particular, the control module 110 includes a USB port 118 positioned along a side of the control module 110 and encapsulated within the control module 110. In some embodiments the USB port 118 is a USB Type-C port, a 24-pin USB connector system including a two-fold rotationally-symmetrical connector, a thunderbolt connection, a micro-USB port, and/or the like. In embodiments where the computer module 116 is configured to facilitate a wired-connection between the portable sensing apparatus 100 and an external device, the USC port 118 is operable to receive the wire for communicatively coupling the computer module 116 to the external device. It should be understood that the external device that supplies power to the computer module 116 via the USB port 118 and the external device that the computer module 116 transmits data to via the USB port 118 may be the same device (e.g., a user interface mobile device). Accordingly, the USB port 118 is operable to supply power to the portable sensing apparatus 100 from an external device and concurrently operable to transmit data from the portable sensing apparatus 100 to an external device.

Still referring to FIG. 1, the portable sensing apparatus 100 further includes a removable service panel 119 disposed over the control module 110. The removable service panel 119 is sized and shaped to enclose the power module 112, the DC power inlet 114, the computer module 116, and the USB port 118 within the control module 110. In this instance, during a use of the portable sensing apparatus 100, the components of the control module 110 are contained therein and shielded from exposure to a working environment as the portable sensing apparatus 100 is secured to an object and receiving one or more forces along the surface region 102.

As will be described in greater detail herein, with the portable sensing apparatus 100 including the plurality of sensing regions 106 along the sensor array 104, the portable sensing apparatus 100 is configured to sense force loads applied thereto along general, non-discrete portions of the surface region 102. It should be understood that with the inclusion of the plurality of sensing regions 106 within the sensor array 104, the portable sensing apparatus 100 may provide a general indication of a location along the portable sensing apparatus 100 where a pressure is received. As will be described in greater detail herein, inclusion of individual, discrete sensors may provide a specific indication of the location in which the portable sensing apparatus receives a pressure.

Figure 2:
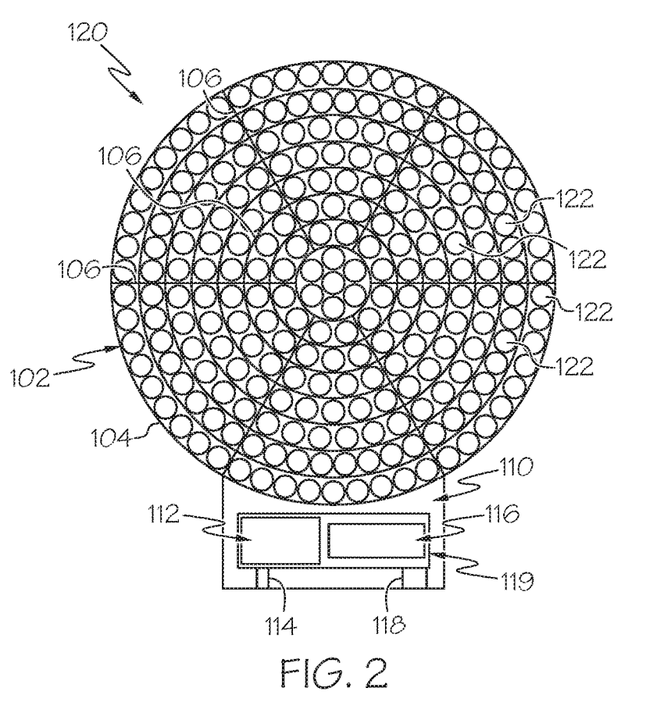
FIG. 2 schematically depicts another illustrative portable sensing apparatus including a plurality of sensors in a circular configuration according to one or more embodiments shown and described herein.

Referring now to FIG. 2, another illustrative portable sensing apparatus 120 is depicted. Except as otherwise described below, it should be understood that the portable sensing apparatus 120 is substantially similar to the portable sensing apparatus 100 described above such that like reference numerals are used to identify like components. However, the portable sensing apparatus 120 is different than the portable sensing apparatus 100 in that the portable sensing apparatus 120 includes a plurality of sensors 122 within the sensor array 104 along the surface region 102. In the present example, the surface region 102 includes the sensor array 104 with each of the plurality of sensing regions 106 including a plurality of individual, discrete sensors 122 positioned therein.

In some embodiments, the plurality of sensors 122 of each of the plurality of sensing regions 106 are sized, shaped and positioned along the surface region 102 relative to an intended-task to be performed with the portable sensing apparats 120. In other words, a location and profile of the plurality of sensors 122 included along the plurality of sensing regions 106 of the sensor array 104 may be determined based on a predetermined use of the portable sensing apparatus 120. Accordingly, the plurality of sensors 122 of the sensor array 104 are sized and positioned along the surface region 102 in manner generally relative to locations where the portable sensing apparatus 100 is to receive a force load thereon when performing the predetermined task on an object in which the portable sensing apparatus 100 is attached to. As will be described in greater detail herein, the plurality of sensors 122 may be positioned along the surface region 102 of the portable sensing apparatus 120 for instances where an operator's body (e.g., hand, foot, etc.) generally receives a force load thereon when performing a predetermined task.

Still referring to FIG. 2, the plurality of sensors 122 of each of the plurality of sensing regions 106 are further sized, shaped and positioned along the surface region 102 relative to a surface curvature of an object that is to receive the portable sensing apparatus 100 thereon. In other words, a profile of the sensor array 104, and the plurality of sensors 122 included therein, along the surface region 102 of the portable sensing apparatus 120 may be determined based on a surface curvature of an object where the portable sensing apparatus 100 is to be located during use. In the present example, with the size and geometries of the sensing regions 106 positioned along an outer, perimeter portion of the surface region 102 having a larger area than the sensing regions 106 positioned along an inner, center portion of the surface region 102, fewer sensors 122 are included on the sensor array 104 within sensing regions 106 near an inner portion of the surface region 102 than an outer portion.

It should be understood that the plurality of sensors 122 within an individual sensing region 106 may vary in size and shape relative one another. It should be further understood that various other sizes, shapes and positions of the sensors 122 positioned within the plurality of sensing regions 106 along the surface region 102 may be included on the portable sensing apparatus 120 than those shown and depicted herein. As will be described in greater detail herein, with the portable sensing apparatus 120 including the plurality of sensors 122 within the plurality of sensing regions 106 of the sensor array 104, the portable sensing apparatus 120 is configured to sense force loads applied thereto along particular, discrete regions of an object that the portable sensing apparatus 120 is positioned on (i.e., on the sensors 122). It should be understood that with the inclusion of the plurality of individual, discrete sensors 122 within each of the plurality of sensing regions 106, the portable sensing apparatus 120 may provide a specific indication of a location along the surface region 102 of the portable sensing apparatus 120 where a pressure is received.

Figure 3:
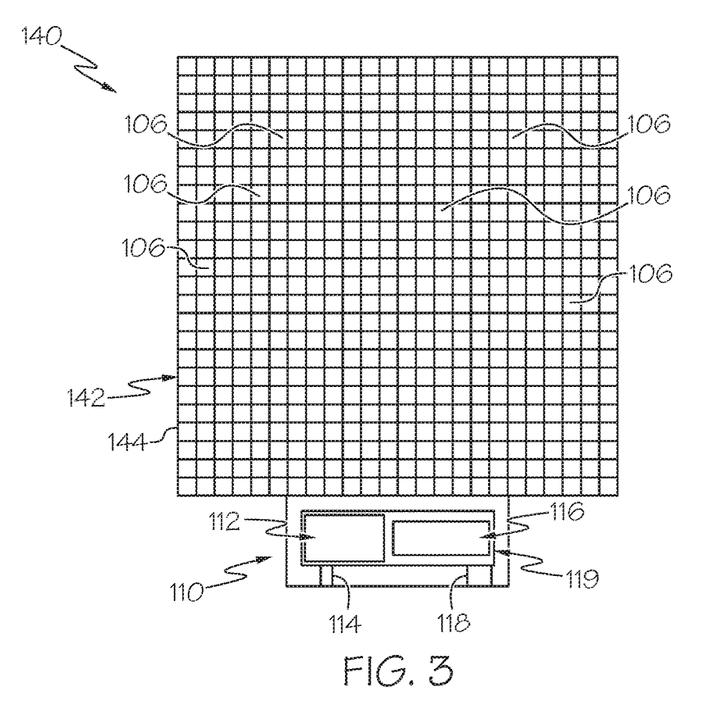
FIG. 3 schematically depicts another illustrative portable sensing apparatus including a plurality of sensing regions in a rectangular configuration according to one or more embodiments shown and described herein.

Referring now to FIG. 3, another illustrative portable sensing apparatus 140 is depicted. Except as otherwise described below, it should be understood that the portable sensing apparatus 140 is substantially similar to the portable sensing apparatus 100 described above such that like reference numerals are used to identify like components. However, the portable sensing apparatus 120 is different than the portable sensing apparatus 100 in that the portable sensing apparatus 140 includes a surface region 142 having a squared configuration that is sized and shaped to receive a sensor array 144 disposed thereon. In the present example, the surface region 142, and the sensor array 144 positioned along the surface region 102, has a length ranging from about 35 millimeters to 150 millimeters, and more particularly about 60 millimeters, and a width ranging from about 35 millimeters to 150 millimeters, and more particularly about 60 millimeters. It should be understood that a size (i.e. area) of the sensor array 144 extending along the surface region 142 may vary in accordance to various factors, such as, for example, a size of an object that the portable sensing apparatus 140 is to be secured to, a surface curvature at a location of the object that the portable sensing apparatus 140 is to be attached at, and/or an application of use of the portable sensing apparatus 140. As briefly described above, the surface region 142 of the portable sensing apparatus 140 may include a sensor array 144 having various other shapes or configurations than those shown and described herein.

The sensor array 144 positioned along the surface region 142 of the portable sensing apparatus 140 includes a plurality of sensing regions 106. The plurality of sensing regions 106 of the sensor array 144 are sized, shaped and positioned along the surface region 142 relative to a squared configuration of the sensor array 144. Additionally, the plurality of sensing regions 106 of the sensor array 144 are sized, shaped and positioned along the surface region 142 relative to an intended-task to be performed along an object (not shown) that the portable sensing apparatus 140 is to be secured to. In other words, a location and profile of the plurality of sensing regions 106 along the sensor array 144 may be determined based on a predetermined use of the object receiving the portable sensing apparatus 140. Accordingly, the sensor array 144 is sized and shaped in accordance with a surface of an object that the portable sensing apparatus 140 is to be positioned on, wherein said surface of the object generally receives a force load thereon when an operator performs the predetermined task.

Still referring to FIG. 3, in the present example the sensor array 144 of the surface region 142 includes a squared configuration such that the portable sensing apparatus 140 is sized and shaped to be received along a region of an object having a planar, flush, and/or uniform surface. The plurality of sensing regions 106 of the sensor array 144 are similarly sized and shaped along the surface region 142. In other embodiments, the plurality of sensing regions 106 of the sensor array 144 may include sensing regions 106 having varying sizes and/or shapes relative one another, such as, for example, larger sensing regions 106 about an outer, perimeter portion of the surface region 142 relative to an inner, center portion of the surface region 142. Further, the plurality of sensing regions 106 of the squared sensor array 144 extend along the surface region 142 in a grid-like orientation. More particularly, the plurality of sensing regions 106 located along the surface region 142 is segmented portions of the squared sensor array 144. However, it should be understood that the plurality of sensing regions 106 of the squared sensor array 144 may include various other shapes, sizes and configurations than those shown and described herein. As also briefly described above, the sensor array 104 and/or the surface region 102 of the portable sensing apparatus 100 may further include various other shapes, sizes and configurations than the squared configuration of the surface region 142 and the sensor array 144 of the present example.

In the present example, the plurality of sensing regions 106 of the sensor array 144 are sized and shaped with substantially similar geometries relative to an adjacent sensing region 106 along the surface region 142. In other embodiments, depending on a predetermined use of the portable sensing apparatus 140 and/or a relative surface curvature of the object on which the portable sensing apparatus 140 is to be secured to, adjacent sensing regions 106 of the plurality of sensing regions 106 may include geometries that are distinct from one another. In other words, a profile of each of the plurality of sensing regions 106 included in the sensor array 144 along the surface region 142 may be determined based on a physical profile of an object in which an operator of the portable sensing apparatus 140 is to secure the portable sensing apparatus 140 to. It should be understood that a size of a sensing region 106 is determinative of a performance of the sensing region 106, and in particular an accuracy of measuring a force load received thereon. Accordingly, the sizes of each of the plurality of sensing regions 106 along the surface region 142 may be adjusted in accordance with a predetermined accuracy threshold for the sensor array 144 of the portable sensing apparatus 140.

Figure 4:
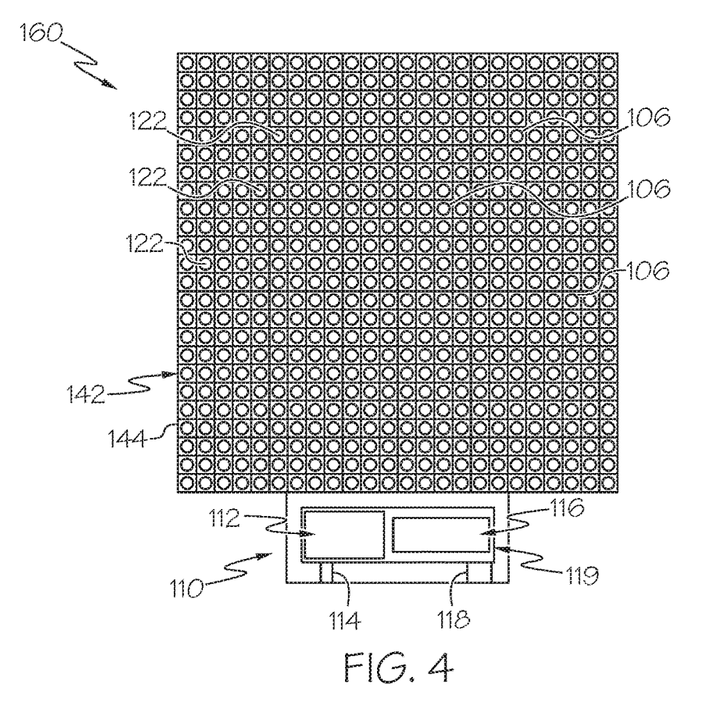
FIG. 4 schematically depicts another illustrative portable sensing apparatus including a plurality of sensing regions in a rectangular configuration according to one or more embodiments shown and described herein.

Referring now to FIG. 4, another illustrative portable sensing apparatus 160 is depicted. Except as otherwise described below, it should be understood that the portable sensing apparatus 160 is substantially similar to the portable sensing apparatuses 120, 140 described above such that like reference numerals are used to identify like components. However, the portable sensing apparatus 160 is different than the portable sensing apparatus 120, 140 in that the portable sensing apparatus 160 includes a plurality of sensors 122 within the squared sensor array 144 along the surface region 142. In the present example, the surface region 142 includes the squared sensor array 144 with each of the plurality of sensing regions 106 including a plurality of individual, discrete sensors 122 positioned therein.

In some embodiments, the plurality of sensors 122 of each of the plurality of sensing regions 106 are sized, shaped and positioned along the surface region 142 relative to an intended-task to be performed with the portable sensing apparats 160. In other words, a location and profile of the plurality of sensors 122 included along the plurality of sensing regions 106 of the sensor array 144 may be determined based on a predetermined use of the portable sensing apparatus 160. Accordingly, the plurality of sensors 122 of the sensor array 144 are sized and positioned along the surface region 142 in manner generally relative to locations where the portable sensing apparatus 160 is to receive a force load thereon when performing the predetermined task on an object in which the portable sensing apparatus 160 is attached to. As will be described in greater detail herein, the plurality of sensors 122 may be positioned along the surface region 142 of the portable sensing apparatus 160 for instances where an operator's body (e.g., hand, foot, etc.) generally receives a force load thereon when performing a predetermined task.

Still referring to FIG. 4, the plurality of sensors 122 of each of the plurality of sensing regions 106 are further sized, shaped and positioned along the surface region 142 relative to a surface curvature of an object that is to receive the portable sensing apparatus 160 thereon. In other words, a profile of the sensor array 144, and the plurality of sensors 122 included therein, along the surface region 142 of the portable sensing apparatus 160 may be determined based on a surface curvature of an object where the portable sensing apparatus 160 is to be located during use. In the present example, with the size and geometries of the sensing regions 106 positioned throughout the surface region 142 having substantially similar dimensions (i.e. areas), an equivalent quantity of sensors 122 are included within the plurality of sensing regions 106 of the sensor array 144.

It should be understood that the plurality of sensors 122 within an individual sensing region 106 may vary in size and shape relative one another. It should be further understood that various other sizes, shapes and positions of the sensors 122 positioned within the plurality of sensing regions 106 along the surface region 102 may be included on the portable sensing apparatus 160 than those shown and depicted herein. As will be described in greater detail herein, with the portable sensing apparatus 160 including the plurality of sensors 122 within the plurality of sensing regions 106 of the sensor array 144, the portable sensing apparatus 160 is configured to sense force loads applied thereto along particular, discrete regions of an object that the portable sensing apparatus 160 is positioned on (i.e., on the sensors 122). It should be understood that with the inclusion of the plurality of individual, discrete sensors 122 within each of the plurality of sensing regions 106, the portable sensing apparatus 160 may provide a specific indication of a location along the surface region 142 of the portable sensing apparatus 160 where a pressure is received.

Figure 5:
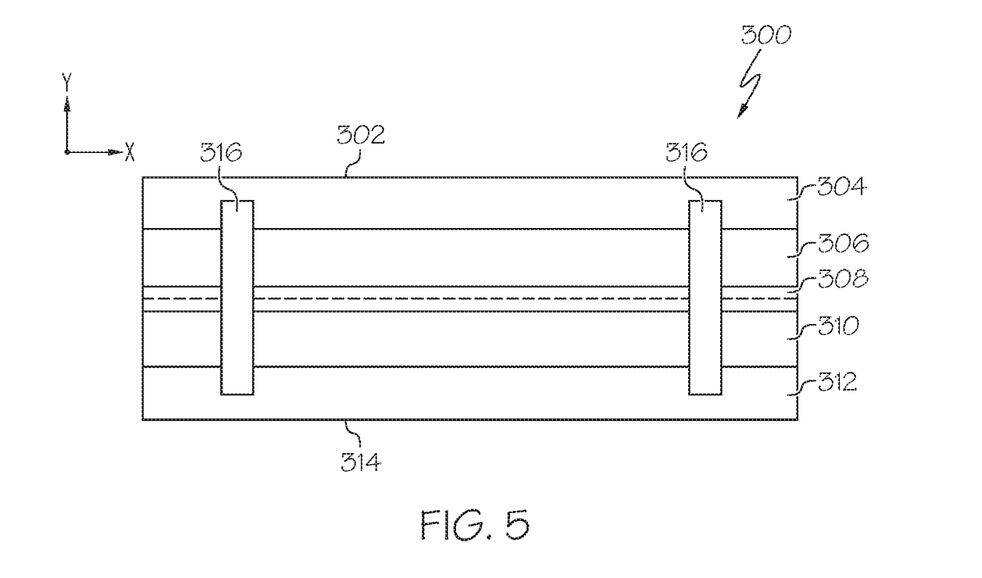
FIG. 5 schematically depicts an illustrative stack design of the sensors of the portable sensing apparatus of FIGS. 1 and 2 according to one or more embodiments shown and described herein.

Referring now to FIG. 5, an illustrative transducer 300 of the sensing regions 106 and/or the sensors 122 are depicted. In particular, FIG. 5 shows a cross-sectional schematic of the sensing region 106 of the portable sensing apparatus 100, 120, 140, 160 and/or the sensor 122 of the portable sensing apparatus 120, 160 including the transducer 300. Accordingly, it should be understood that the sensing region 106 of the portable sensing apparatus 100, 120, 140, 160 and/or the sensor 122 of the portable sensing apparatus 120, 160 described above may comprise the transducer 300 shown herein. The transducer 300 may comprise a plurality of layers disposed over one another and is generally configured to maintain a thin normalization structure, such that the portable sensing apparatus 100, 120, 140, 160 is relatively lightweight when received along a surface of an object. The plurality of layers of the transducer 300 may include varying thicknesses, material compositions, and elasticity dependent on surface characteristics of an object in which the sensing region 106 and/or the sensor 122 is positioned along. It should be understood that although the plurality of layers of the transducer 300 is depicted as having a planar (i.e., flat) profile, dependent on an surface curvature of the object at a location in which the portable sensing apparatus 100, 120, 140, 160 is attached to, the layers of the transducer 300 may be curved, angled, of varying thicknesses, and/or the like.

In the present example, the transducer 300 includes a sensing layer 308 positioned between an outer-diffusion layer 306 and an inner-diffusion layer 310 such that the sensing layer 308 is disposed therein. The transducer 300 further includes the outer-diffusion layer 306 and the inner-diffusion layer 310 positioned between an outer-contact layer 304 and an inner-contact layer 312 such that the pair of diffusion layers 306, 310 are disposed within the pair of contact layers 304, 312. In this instance, the outer-contact layer 304 and the inner-contact layer 312 define the external boundaries of the transducer 300 such that the remaining layers 306, 308, 310 are positioned therebetween. The outer-contact layer 304 defines an outer surface 302 opposite of the layers 306, 308, 310 and the inner-contact layer 312 defines an inner surface 314 opposite of the layers 306, 308, 310. It should be understood that the outer surface 302 of the transducer 300 is positioned relatively upward along the surface region 102, 142 such that the outer surface 302 faces opposite of, and is offset from, a surface of an object when the portable sensing apparatus 100, 120, 140, 160 is secured thereto. Accordingly, the inner surface 314 of the transducer 300 is positioned relatively inward along the surface region 102, 142 such that the inner surface 314 faces toward, and abuts against, a surface of an object when the portable sensing apparatus 100, 120, 140, 160 is secured thereto.

Still referring to FIG. 5, the transducer 300 further includes one or more guide features 316 extending through and connecting the plurality of layers 304, 306, 308, 310, 312. In the present example, the transducer 300 includes a pair of guide features 316 positioned perpendicularly relative to a direction in which the pair of contact layers 304, 312, the pair of diffusion layers 306, 310, and the sensing layer 308 extend. The pair of guide features 316 include a thickness that is relatively less than the pair of contact layers 304, 312 and the pair of diffusion layers 306, 310 such that the pair of guide features 316 are relatively soft and flexible. In some embodiments, the pair of guide features 316 comprises VeroWhitePlus™, photopolymers, three-dimensional printing material, digital materials, and/or the like. The pair of guide features 316 is configured to maintain an alignment of the pair of contact layers 304, 312, the pair of diffusion layers 306, 310, and the sensing layer 308 to thereby improve a detection accuracy of a force received along the sensing region 106 and/or the sensor 122. The pair of guide features 316 may further reduce a longitudinal loading on the sensing layer 308. As will be described in greater detail herein, the transducer 300 of the sensing region 106 and/or the sensor 122 may include additional and/or fewer layers and/or guide features than those shown and described herein without departing from the scope of the present disclosure.

For example, a quantity of the guide features 316 included in the transducer 300 of the sensing region 106 and/or the sensor 122 may be dependent on a shape and/or contour of the object in which the sensing region 106 and/or the sensor 122 is to be positioned along. In instances where the sensing region 106 and/or the sensor 122 is positioned along a surface that includes a substantial curvature, additional guide features 316 may be required to maintain adequate alignment of the plurality of layers 304, 306, 308, 310, 312 of the transducer 300. In contrast, fewer and/or no guide features 316 may be required when the sensing region 106 and/or the sensor 122 is positioned along a surface of an object that does not include a substantially irregular shape or contour.

Referring still to FIG. 5, a lateral distance between the one or more guide features 316 may increase and/or decrease dependent on a shape and/or contour of the surface of the object in which the sensing region 106 and/or the sensor 122 is to be positioned along. In instances where the sensing region 106 and/or the sensor 122 is positioned along a surface that includes a substantial curvature, a smaller lateral distance between the two or more guide features 316 may be required to maintain adequate alignment of the plurality of layers 304, 306, 308, 310, 312 of the transducer 300 as compared to a surface of an object that has less curvature. In contrast, a greater lateral distance may be adequate between the two or more guide features 316 when the sensing region 106 and/or the sensor 122 is positioned along a surface that does not include a substantial shape or contour as compared to a surface that has more curvature.

The sensing layer 308 of the transducer 300 is a pressure sensor that includes a three-dimensional load cell configured to convert a pressure (e.g., force load) received thereon into an electrical signal indicative of a magnitude of the pressure applied thereto. In some embodiments, the sensing layer 308 is a printed layer comprising, for example, a piezoresistive fabric, a polyethylene terephthalate (PET), and the like. The sensing layer 308 is a flexible layer relative to the pair of contact layers 304, 312 and the pair of diffusion layers 306, 310 due to a relatively smaller thickness, material composition, and/or the like. In some embodiments the sensing layer 308 may include one or more intermediate layers disposed about the sensing layer 308 such that the sensing layer 308 is separated by the pair of diffusion layers 306, 310 by the one or more intermediate layers. The intermediate layer may comprise a coating, film, fabric, conductive ink, polymer, hard plastic, and/or the like. In other embodiments, the transducer 300 may include a sensor pocket for receiving the sensing layer 308 therein and between the pair of diffusion layers 306, 310 and the pair of contact layers 304, 312 such that the sensing layer 308 may be selectively removed and replaced from the portable sensing apparatus 100, 120, 140, 160 when necessary.

Still referring to FIG. 5, the pair of diffusion layers 306, 310 and the pair of contact layers 304, 312 are formed of three-dimensional printed digital material having an elasticity. In some embodiments, the pair of contact layers 304, 312 and/or the pair of diffusion layers 306, 310 may comprise VeroWhitePlus™, Tank Black Plus™, and/or the like. Generally, the outer-contact layer 304 and the outer-diffusion layer 306 include material compositions that provide incompressible, rigid characteristics relative to the inner-contact layer 312 and the inner-diffusion layer 310, which include material compositions that provide compressible, softer characteristics. In some embodiments, the pair of diffusion layers 306, 310 includes a greater elasticity than the pair of contact layers 304, 312 such that the pair of diffusion layers 306, 310 are flexible and/or softer relative to the pair of contact layers 304, 312. In this instance, the pair of contact layers 304, 312 provides a rigid, outer composition for the transducer 300 of the sensing region 106 and/or the sensor 122. As will be described in greater detail herein, the enhanced elasticity of the pair of diffusion layers 306, 310 allows the pair of diffusion layers 306, 310 to selectively compress and/or deform when a load (i.e., force) is received on the sensing region 106 and/or the sensor 122 to redirect the load toward the sensing layer 308 disposed therebetween.

For example, the pair of diffusion layers 306, 310 may include an elasticity that ranges from a Shore Hardness value of about 27A to about 35A, and the pair of contact layers 304, 312 may include an elasticity that ranges from a Shore Hardness value of about 40A to about 75A. It should be understood that in instances where the sensor array 144 of the portable sensing apparatus 120, 160 includes a plurality of sensors 122 positioned therein (See, e.g., FIGS. 2 and 4), the pair of contact layers 304, 312 and/or the pair of diffusion layers 306, 310 of the plurality of sensors 122 may include a relatively softer material having a lower Shore Hardness value to further enhance a tactility of the individual, discrete sensors 122 of the transducer 300.

Alternatively, in instances where the sensing region 106 and/or the sensor 122 of the portable sensing apparatus 100, 120, 140, 160 is positioned along a surface of an object that includes a curvature that requires the layers of the transducer 300 to be form-fitted, one or more layers of the transducer 300 may include a material having a greater Shore Hardness value to provide adequate rigidity to the sensing region 106 and/or the sensor 122. It should be understood that the pair of contact layers 304, 312 of the sensing region 106 of the portable sensing apparatus 100, 140 (See, e.g., FIGS. 1 and 3) include a relatively harder material composition than the pair of contact layers 304, 312 of the portable sensing apparatus 120, 160 (See, e.g., FIGS. 2 and 4) as a localization area of an individual, discrete sensor 122 may be relatively smaller than an area of a sensing region 106. Accordingly, an increased hardness is required to maintain proper strength for the transducer 300 of the plurality of sensing regions 106 than the transducer 300 of the plurality of sensors 122 due to a greater size (e.g., surface area) of the transducer 300.

Referring still to FIG. 5, in some embodiments an elasticity of the inner-diffusion layer 310 and/or the inner-contact layer 312 may differ from the outer-diffusion layer 306 and the outer-contact layer 304, respectively, in instances where the transducer 300 of the sensing region 106 and/or the sensor 122 is located along a surface where enhanced flexibility is desirable, such as, for example, a surface of an object having an irregularly-shaped profile. In particular, the inner-diffusion layer 310 may include a Shore Hardness that differs from a Shore Hardness of the outer-diffusion layer 306 to provide adequate flexibility for the surface region 102, 142 of the portable sensing apparatus 100, 120, 140, 160, since the inner-diffusion layer 310 is positioned relatively adjacent to the inner surface 314 of the transducer 300 which may abut against the surface of the object. In other embodiments the inner-contact layer 312 may include a Shore Hardness that differs from a Shore Hardness of the outer-contact layer 304 to provide enhanced maneuverability for the sensor array 104 along the surface region 102, 142 of the portable sensing apparatus 100, 120, 140, 160, since the inner-contact layer 312 is positioned relatively adjacent to the inner surface 314 of the transducer 300 which may abut against a surface of an object. For example, the inner-contact layer 312 may include an elasticity that ranges from a Shore Hardness value of about 75A to about 85A. In other embodiments, the inner-contact layer 312 may have a greater rigidity than an outer-contact layer 304, such as, for example, a Shore Hardness ranging from about 40A to about 75D.

The pair of diffusion layers 306, 310 of the transducer 300 includes a greater thickness than the pair of contact layers 304, 312. For example, the pair of diffusion layers 306, 310 may include a thickness of about 0.50 millimeters to about 1.0 millimeters and the pair of contact layers 304, 312 may include a thickness of about 0.25 millimeters to about 0.75 millimeters. It should be understood that in instances where the sensor array 144 of the portable sensing apparatus 120, 160 includes a plurality of sensors 122 positioned therein (See, e.g., FIGS. 2 and 4), the pair of contact layers 304, 312 and/or the pair of diffusion layers 306, 310 may include a relatively thinner material having a smaller thickness to further enhance a flexibility of the individual, discrete sensors 122 of the transducer 300.

Alternatively, in instances where the sensing region 106 and/or the sensor 122 of the portable sensing apparatus 100, 120, 140, 160 is positioned along a surface of an object that includes a surface curvature that requires the layers of the transducer 300 to be form-fitted (i.e., the object has a substantial surface curvature), one or more layers of the transducer 300 may include a material having a thinner thickness to provide adequate rigidity to the sensing region 106 and/or the sensor 122 as adequate force diffusion requires a minimum material thickness. However, it should be understood that a thickness of the layers of the transducer 300 may vary dependent on a compressibility of an object's surface where the sensing region 106 and/or the sensor 122 of the portable sensing apparatus 100, 120, 140, 160 is located such that the thickness and elasticities described herein may vary per object.

It should be understood that in some embodiments one or more layers of the transducer 300 may be modified or omitted based on a physical configuration and profile of an object that the portable sensing apparatus 100, 120, 140, 160 is to be secured to, a task to be performed by the portable sensing apparatus 100, 120, 140, 160, and/or the like. Alternatively, in instances where the portable sensing apparatus 120, 160 includes the sensor array 144 that has a plurality of sensors 122 positioned therein, one or more layers of the transducer 300 of the plurality of sensors 122 may be modified or omitted to increase a capability of the portable sensing apparatus 120, 160 to detect a specific location in which a pressure is applied to the surface region 102, 142. For example, in embodiments where the sensor array 144 of the portable sensing apparatus 120, 160 may be positioned along surface of an objects that includes an inherently rigid surface, a thickness of one or more layers of the transducer 300 may be reduced, an elasticity of one or more layers of the transducer 300 may be increased, and/or one or more layers of the transducer 300 may be omitted. In other words, due to the naturally rigid surface characteristics of certain objects, the transducer 300 of the sensing regions 106 and/or sensors 122 may not be required to include a rigid configuration.

By way of further example, in embodiments where the sensor array 104 of the portable sensing apparatus 100, 120, 140, 160 may be positioned along surfaces of an object that include an inherently flexible surface, a thickness of one or more layers of the transducer 300 may be increased, an elasticity of one or more layers of the transducer 300 may be reduced, and/or one or more layers of the transducer 300 may be omitted. In other words, due to the naturally soft surface characteristics of certain objects, the transducer 300 of the sensing regions 106 and/or sensors 122 may be required to include a rigid configuration.

Still referring to FIG. 5, the inner-diffusion layer 310 and/or the inner-contact layer 312 may be omitted entirely from the transducer 300, such as, for example, in instances where the sensor array 144 of the portable sensing apparatus 120, 160 includes a plurality of sensors 122 therein, in this instance, one or more of the plurality of sensors 122 may include the transducer 300 comprising at least the outer-contact layer 304, the outer-diffusion layer 306, and the sensing layer 308. In this embodiment, with an omission of one or more of the inner-diffusion layer 310 and/or the inner-contact layer 312, a thickness and/or material elasticity of the remaining layers of the transducer 300 may be varied to accommodate for the omission. For example, omitting the inner-contact layer 312 of the transducer 300 may be accommodated by increasing a thickness of the inner-diffusion layer 310 to provide suitable rigidity for the transducer 300 to perform adequate force distribution. Additionally, a material elasticity of the inner-diffusion layer 310 of the transducer 300 may be decreased to provide adequate diffusion of pressure across the sensing region 106 due to an omission of the inner-contact layer 312. In other words, a hardness and/or rigidity of the inner-diffusion layer 310 of the transducer 300 may be increased to accommodate for the omission of the inner-contact layer 312 to adequately receive, distribute, and normalize the force load received along the inner surface 314 of the transducer 300 through such the inner-diffusion layer 310.

In other embodiments the outer-contact layer 304 and the outer-diffusion layer 306 may be omitted for a single outer layer (not shown) disposed over the sensing layer 308. In this embodiment, the material compositions of the outer-contact layer 304 and the outer-diffusion layer 306 may be collectively provided in a single outer layer to adequately provide the rigidity, compressibility, and structure collectively provided in the outer-contact layer 304 and the outer-diffusion layer 306. In this instance, only a single layer is printed atop the sensing layer 308 such that the single outer layer is configured and operable to perform the distribution and diffusion characteristics originally performed by the outer-contact layer 304 and the outer-diffusion layer 306 described herein, respectively. The single outer layer may include a varying elasticity (i.e., Shore Hardness) through a lateral thickness of the layer to thereby facilitate both a distribution and diffusion of a force therethrough. In other words, the single outer layer of the present embodiment is configured to receive a force, distribute the force into a plurality of forces, and normalize the plurality of forces prior to conveying the plurality of normalized-forces to the sensing layer 308 secured thereto.

It should be understood that the inner-contact layer 312 and the inner-diffusion layer 310 may similarly be omitted for a single inner layer (not shown) disposed over the sensing layer 308, in lieu of the single outer layer and/or in addition to the single outer layer. In particular, the single inner layer may be disposed over the sensing layer 308 along a surface opposite of the single outer layer A material composition of the inner-contact layer 312 and the inner-diffusion layer 310 may be collectively provided in a single inner layer to adequately provide the rigidity, compressibility, and structure collectively provided in the inner-contact layer 312 and the inner-diffusion layer 310. In this instance, only a single layer is printed along the sensing layer 308, opposite a surface of the sensing layer 308 including the single outer layer, such that the single inner layer is configured and operable to perform the distribution and diffusion characteristics originally performed by the inner-contact layer 312 and the inner-diffusion layer 310 described herein, respectively. The single inner layer may include a varying elasticity (i.e., Shore Hardness) through a lateral thickness of the layer to thereby facilitate a distribution and diffusion of forces therethrough. In other words, the single inner layer of the present embodiment is configured to receive a force (e.g., normal force), distribute the force into a plurality of forces, and normalize the plurality of forces prior to conveying the plurality of normalized-forces to the sensing layer 308 secured thereto.

Figure 6:
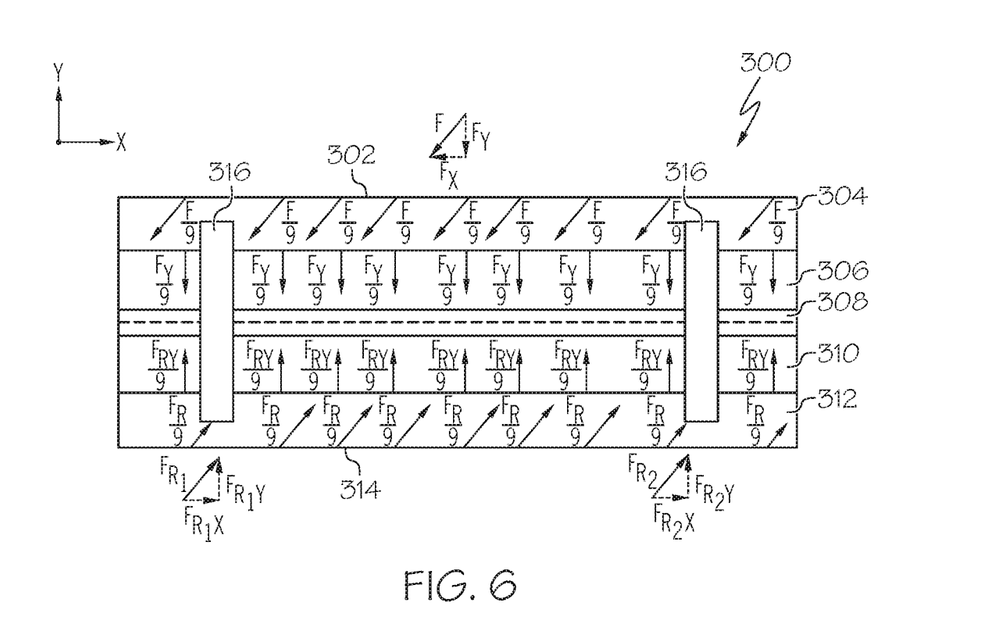
FIG. 6 schematically depicts illustrative force distribution across the stack design of the sensors of portable sensing apparatus of FIGS. 1 and 2 according to one or more embodiments shown and described herein.
Figure 7:
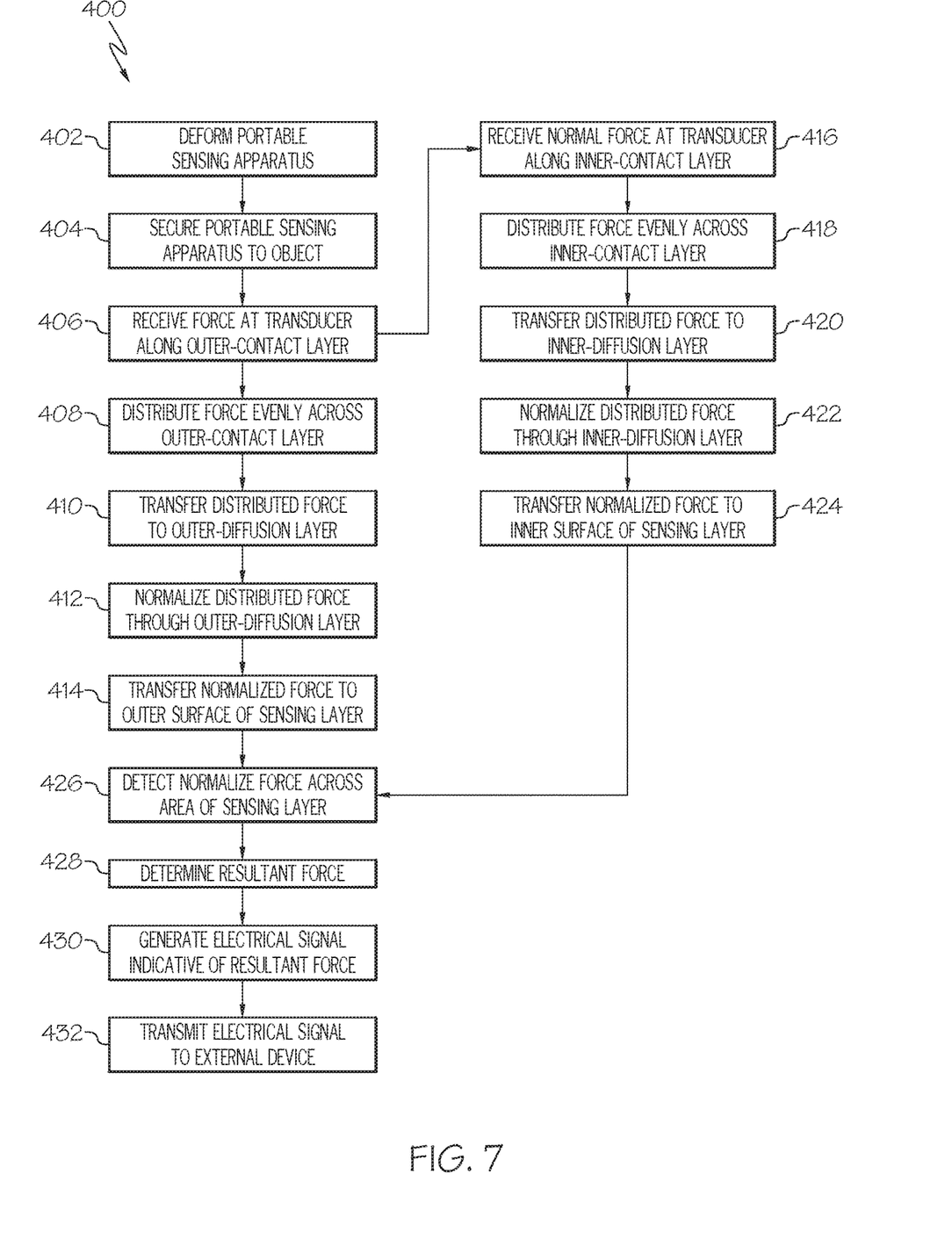
FIG. 7 depicts a flow diagram of an illustrative method of distributing a force across a sensor of the portable sensing apparatus of FIGS. 1 and 2 according to one or more embodiments shown and described herein.

Referring now to FIG. 6 in conjunction with the flow diagram of FIG. 7, an exemplary method 400 of detecting and measuring a force load applied to the portable sensing apparatus 100, 120, 140, 160 is schematically depicted. More specifically, the portable sensing apparatus 100, 120, 140, 160 is operable to measure a resultant pressure generated from force loads received along the sensor array 104, 144 of the portable sensing apparatus 100, 120, 140, 160 at various angular orientations relative to a surface of the object. The depiction of FIGS. 6-7 and accompanying description below is not meant to limit the subject matter described herein or represent an exact description of how forces may be distributed among the layers, but instead is meant to provide a simple schematic overview to illustrate the general force distribution characteristics of the layers described herein.

At step 402, the portable sensing apparatus 100, 120, 140, 160 is positioned against an exterior surface of an object that the portable sensing apparatus 100, 120, 140, 160 is to be secured to and thereby selectively deformed in accordance to a physical profile of an object. In other words, a shape and orientation of the surface region 102, 142 of the portable sensing apparatus 100, 120, 140, 160 is mechanically manipulated to conform to a shape and orientation of a surface curvature of an object such that the surface region 102, 142 is form fitted to an exterior surface of an object. At step 404, the portable sensing apparatus 100, 120, 140, 160 is securely attached to an exterior surface of an object via an attachment mechanism of the portable sensing apparatus 100, 120, 140, 160. In some embodiments, the attachment mechanism of the portable sensing apparatus 100, 120, 140, 160 includes an adhesive strip located along the inner surface 314 of the transducer 300 (see FIGS. 5-6) such that an operator of the portable sensing apparatus 100, 120, 140, 160 may expose the adhesive along the inner surface 314 to thereby secure the portable sensing apparatus 100, 120, 140, 160 to the object.

Referring to FIG. 6 and at step 406, a force F is received along the sensor array 104 of the portable sensing apparatus 100, 120, 140, 160, and in particular along the outer-contact layer 304 of the transducer 300 of the sensing region 106 and/or the sensor 122. The force F consists of a horizontal component $F_X$ and a vertical component $F_Y$ such that the force vector F is received along the outer-contact layer 304 at a transverse orientation relative to the outer surface 302 of the transducer 300. In other words, the force F is a vector quantity that includes both a magnitude and direction received along the sensing region 106 and/or the sensor 122 of the portable sensing apparatus 100, 120, 140, 160. At step 416, in response to the outer-contact layer 304 receiving the force F along the outer surface 302 of the transducer 300, one or more normal forces $F_{R1}$, $F_{R2}$, are generated and received at the inner-contact layer 312 along the inner surface 314 of the transducer 300. The one or more normal forces $F_{R1}$, $F_{R2}$, are reactive forces applied to the transducer 300 by the object's surface positioned adjacent to and abutting against the inner surface 314. The normal forces $F_{R1}$, $F_{R2}$, consists of a horizontal component $F_R^1{}_X$, $F_R^2{}_X$ and a vertical component $F_R^1{}_Y$, $F_R^2{}_Y$ such that the normal force vectors $F_{R1}$, $F_{R2}$, are received along the inner-contact layer 312 at a transverse orientation relative to the inner surface 314 of the transducer 300.

Accordingly, the sensing region 106 and/or the sensor 122 receives at least one force F at the outer-contact layer 304 by an operator's hand engaging the portable sensing apparatus 100, 120, 140, 160 at the surface region 102, 142 and at least one normal force $F_R$ at the inner-contact layer 312 by an exterior surface of an object positioned thereon. It should be understood that the quantity of forces F and/or normal forces $F_R$ received along the outer-contact layer 304 and/or inner-contact layer 312, respectively, may correspond to a number of contact points along the layers in which the transducer 300 engages an object and/or an occupant's hand thereon. In the present example, an occupant's hand engages the transducer 300 along the outer surface 302 at a single location such a single force F is generated and applied to the outer-contact layer 304. In correspondence to the single force F, an object that the portable sensing apparatus 100, 120, 140, 160 is secured to engages the surface at two locations such that a pair of normal forces $F_{R1}$, $F_{R2}$ are generated and applied to the inner-contact layer 312. It should be understood that additional and/or fewer forces F and/or normal forces $F_{R1}$, $F_{R2}$ may be applied to the sensing region 106 and/or the sensor 122 of the portable sensing apparatus 100, 120, 140, 160 than those shown and depicted herein without departing from the scope of the present disclosure.

Still referring to FIG. 6 and at step 408, the outer-contact layer 304 distributes the force F received along the outer surface 302 of the transducer 300 evenly therethrough such that the force F is equally distributed through an area of the outer-contact layer 304. It should be understood that dependent on a magnitude of the force vector F, the force F is divided an "N" number of times $$\frac{F}{N}$$

such that the initial force F received at the transducer 300 is equally distributed through the outer-contact layer 304 and toward the outer-diffusion layer 306. In the present example, the force F is dispersed through the outer-contact layer 304 into nine equal distributions $$\frac{F}{9},$$

however, in other examples the force vector F may include a greater and/or lesser magnitude such that the force F may be dispersed into various other distribution amounts. At step 418, the inner-contact layer 312 distributes the normal forces $F_{R1}$, $F_{R2}$ received along the inner surface 314 of the transducer 300 evenly therethrough such that the normal forces $F_{R1}$, $F_{R2}$ (i.e., reactive forces) are equally distributed through an area of the inner-contact layer 312. It should be understood that dependent on a magnitude of the force vector F, the normal forces $F_{R1}$, $F_{R2}$ are divided an "N" number of times $$\frac{FR}{N}$$

such mat the initial normal forces $F_{R1}$, $F_{R2}$ received at the transducer 300 are equally distributed through the inner-contact layer 312 and toward the inner-diffusion layer 310 at a substantially equivalent quantity as the initial force vector F along the outer-contact layer 304. In the present example, the normal forces $F_{R1}$, $F_{R2}$ are dispersed through the inner-contact layer 312 into nine equal distributions $$\frac{FR}{9}$$

in correspondence to the distributions of the force $$\frac{F}{9}$$

in the outer-contact layer 304.

At step 410, with the forces $$\frac{F}{9}$$

distributed across the area of the outer-contact layer 304 into one or more force segments, the distributed forces $$\frac{F}{9}$$

are transferred onto the outer-diffusion layer 306 that is positioned adjacent to and in communication with the outer-contact layer 304. In this instance, the outer-diffusion layer 306 receives the distributed forces $$\frac{F}{9}$$

across a surface area of the outer-diffusion layer 306 at various locations corresponding to the one or more segments $$\frac{F}{9}$$

distributed by the outer-contact layer 304. At step 412, the outer-diffusion layer 306 normalizes the distributed forces $$\frac{F}{9}$$

received from the outer-contact layer 304 therethrough such that the force vectors $$\frac{F}{9}$$

are stabilized and transitioned into scalar forces $$\frac{FY}{9}$$

with an accumulative magnitude equivalent to the magnitude of the force vector F initially received at the outer-contact layer 304. At step 420, with the normal forces $$\frac{FR}{9}$$

distributed across the area of the inner-contact layer 312 into one or more normal force segments $$\frac{FR}{9},$$

the distributed normal forces $$\frac{FR}{9}$$

are transferred onto the inner-diffusion layer 310 that is positioned adjacent to and in communication with the inner-contact layer 312. In this instance, the inner-diffusion layer 310 receives the distributed normal forces $$\frac{FR}{9}$$

across a surface area of the inner-diffusion layer 310 at various locations corresponding to the one or more segments $$\frac{FR}{9}$$

distributed by the inner-contact layer 312. At step 422, the inner-diffusion layer 310 normalizes the distributed normal forces $$\frac{FR}{9}$$

received from the inner-contact layer 312 therethrough such that the normal force vectors $$\frac{FR}{9}$$

are stabilized and transitioned into scalar forces $$\frac{FRY}{9}$$

with an accumulative magnitude equivalent to the original magnitude of the normal force vectors $F_{R1}$, $F_{R2}$ received at the inner-contact layer 312.

Still referring to FIG. 6 and at step 414, with the scalar forces $$\frac{FY}{9}$$

normalized and distributed across the area of the outer-diffusion layer 306, the normalized and distributed forces $$\frac{FY}{9}$$

are transferred onto the sensing layer 308 that is positioned adjacent to and in communication with the outer-diffusion layer 306. In this instance, the sensing layer 308 receives the normalized and distributed forces $$\frac{FY}{9}$$

across a surface area of the sensing layer 308 at various locations, along an outer surface of the sensing layer 308, corresponding to the one or more segments distributed by the outer-diffusion layer 306. At step 424, with the scalar normal forces $$\frac{FRY}{9}$$

normalized and distributed across the area of the inner-diffusion layer 310, the normalized and distributed normal forces $$\frac{FRY}{9}$$

are transferred onto the sensing layer 308 that is positioned adjacent to and in communication with the inner-diffusion layer 310. In this instance, the sensing layer 308 receives the normalized and distributed normal forces $$\frac{FRY}{9}$$

across a surface area of the sensing layer 308 at various locations, along an inner surface of the sensing layer 308, corresponding to the one or more segments distributed by the inner-diffusion layer 310.

At step 426, the sensing layer 308 receives and detects the normalized and distributed forces $$\frac{FY}{9}$$

from the outer layers 304, 306 (i.e., the outer-contact layer 304 and the outer-diffusion layer 306) and the normalized and distributed normal forces $$\frac{FRY}{9}$$

from the inner layers 310, 312 (i.e., the inner-diffusion layer 310 and the inner-contact layer 312) at a plurality of locations across a surface area of the sensing layer 308. In this instance, the plurality of forces are equally distributed and applied to the sensing layer 308 at scalar quantities that are measurable with greater accuracy due to the even distribution and normalized force vectors. At step 428, with a magnitude of the initial force F and the normal forces $F_{R1}$, $F_{R2}$ measured, the sensing layer 308 determines a resultant pressure applied to the sensing region 106 and/or the sensor 122 of the portable sensing apparatus 100, 120, 140, 160.

The above-described system includes a portable sensing apparatus that provides a sensor array sized and shaped to be positioned along various exterior surfaces of an object. The portable sensing apparatus is selectively deformable such that a shape and size of the sensor array may be mechanically adjusted in accordance with a surface curvature of an object. The sensor array includes one or more non-discrete sensing regions and/or discrete sensors positioned therein for detecting and measuring a force applied thereto. The one or more non-discrete sensing regions and/or discrete sensors comprise a transducer that includes a sensor disposed within a pair of diffusion layers and further disposed within a pair of contact layers that distribute a force received along the outer surfaces of the transducer across the pair of diffusion layers. The pair of diffusion layers thereby normalizes the forces received from the pair of contact layers and distributes the normalized forces across the sensing layer disposed therein for detection and to determine a resultant pressure applied to the sensor.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A portable sensing apparatus comprising:
   an attachment mechanism configured to secure the portable sensing apparatus to an object;
   a communications module; and
   a flexible sensor communicatively coupled to the communications module, the flexible sensor configured to mechanically deform in accordance with a shape of the object, the flexible sensor comprising:
      a pair of contact layers including an inner-contact layer and an outer-contact layer, the inner-contact layer formed from a first material having a greater elasticity than a second material forming the outer-contact layer;
      a pair of diffusion layers disposed between the pair of contact layers, the pair of diffusion layers including an inner-diffusion layer and an outer-diffusion layer, the inner-diffusion layer having a greater elasticity than the outer-diffusion layer; and
      a sensing layer disposed between the pair of diffusion layers.

2. The portable sensing apparatus of claim 1, wherein the sensing layer receives a force at a plurality of locations across a surface area of the sensing layer to determine a resultant pressure applied to the flexible sensor, and the communications module transmits an electrical signal indicative of the resultant pressure to an external device, and wherein the flexible sensor is a three-dimensional load cell that converts the resultant pressure acting on the sensing layer into the electrical signal, wherein a magnitude of the electrical signal comprises a resultant force received at the flexible sensor.

3. The portable sensing apparatus of claim 1, wherein the portable sensing apparatus comprises a circular or rectangular shape, wherein the circular shape includes a diameter ranging from 50 millimeters to 150 millimeters and the rectangular shape includes a surface area ranging from 35 millimeters to 150 millimeters.

4. The portable sensing apparatus of claim 1, wherein the pair of diffusion layers include a greater elasticity than the pair of contact layers such that the pair of diffusion layers are flexible relative to the pair of contact layers.

5. The portable sensing apparatus of claim 4, wherein the elasticity of the pair of diffusion layers ranges from a Shore Hardness value of about 27A to 35A, and the elasticity of the pair of contact layers ranges from a Shore Hardness value of about 40A to 75A.

6. The portable sensing apparatus of claim 1, wherein a thickness of the pair of diffusion layers is about 0.5 millimeters and a thickness of the pair of contact layers is about 0.25 millimeters.

7. The portable sensing apparatus of claim 1, wherein the attachment mechanism is an adhesive positioned along at least one of the pair of contact layers of the flexible sensor.

8. The portable sensing apparatus of claim 1, wherein the outer-contact layer of the pair of contact layers extends along an outer surface of the portable sensing apparatus distal to the attachment mechanism, and the inner-contact layer of the pair of contact layers extends along an inner surface of the portable sensing apparatus proximate to the attachment mechanism.

9. The portable sensing apparatus of claim 8, wherein the inner-contact layer of the pair of contact layers receives a force from the outer surface of the portable sensing apparatus and the outer-contact layer of the pair of contact layers receives a normal force generated at the inner surface of the portable sensing apparatus in response to the inner-contact layer of the pair of contact layers receiving the force at the outer surface.

10. The portable sensing apparatus of claim 1, wherein the communications module includes an electrical communications port such that the communications module transmits the electrical signal to the external device via a wire coupled to the communications module at the electrical communications port.

11. The portable sensing apparatus of claim 1, wherein the communications module is a wireless communications device such that the communications module wirelessly transmits the electrical signal to the external device.

12. The portable sensing apparatus of claim 1, further comprising a control module including a printed circuit board and a battery, wherein the battery is coupled to the printed circuit board and the printed circuit board is coupled to the sensing layer such that the battery supplies power to the sensing layer through the printed circuit board.

13. A method comprising:
   positioning a portable apparatus against an exterior surface of an object;
   attaching the portable apparatus to the object;
   receiving a force applied to the object along a flexible sensor of the portable apparatus, the flexible sensor comprising:
      a pair of contact layers including an inner-contact layer and an outer-contact layer, the inner-contact layer formed from a first material having a greater elasticity than a second material forming the outer-contact layer;
      a pair of diffusion layers disposed between the pair of contact layers, the pair of diffusion layers including an inner-diffusion layer and an outer-diffusion layer, the inner-diffusion layer having a greater elasticity than the outer-diffusion layer; and
      a sensing layer disposed between the pair of diffusion layers;
   receiving the forces from the plurality of locations across the outer-contact layer at a plurality of locations along the outer-diffusion layer of the flexible sensor, wherein the outer-diffusion layer is disposed beneath the outer-contact layer relative to the force received thereon; and receiving the forces across the sensing layer of the flexible sensor, wherein the sensing layer is disposed beneath the outer-contact layer and the outer-diffusion layer relative to the force received thereon.

14. The method of claim 13, wherein attaching the portable apparatus to the object comprises securing an adhesive positioned along the outer-contact layer of the flexible sensor to an exterior of the object.

15. The method of claim 13, further comprising:

receiving a normal force along the inner-contact layer of the flexible sensor in response to the outer-contact layer of the sensor receiving the force;

distributing the normal force applied to the inner-contact layer to a plurality of locations across the inner-contact layer;

receiving the normal forces from the plurality of locations of the inner-contact layer at a plurality of locations of the inner-diffusion layer of the portable apparatus, wherein the inner-diffusion layer is disposed above the inner-contact layer relative to the normal force received thereto; and receiving the normal forces across the sensing layer, wherein the sensing layer is disposed above the inner-contact layer and the inner-diffusion layer relative to the normal force received thereon.

16. The method of claim 13, further comprising:

determining a resultant pressure applied to the flexible sensor from the forces and the normal forces received across the sensing layer; and transmitting an electrical signal indicative of the resultant pressure to an external device via a communications module of the portable apparatus.

17. A deformable apparatus comprising:

an attachment mechanism configured to secure the deformable apparatus to an object;

a communications module; and a flexible sensor communicatively coupled to the communications module, wherein the flexible sensor includes:

a pair of contact layers including an inner-contact layer and an outer-contact layer, the inner-contact layer formed from a first material having a greater elasticity than a second material forming the outer-contact layer;

a pair of diffusion layers disposed between the pair of contact layers, the pair of diffusion layers including an inner-diffusion layer and an outer-diffusion layer, the inner-diffusion layer having a greater elasticity than the outer-diffusion layer; and a sensing layer disposed between the outer-diffusion layer and the inner-diffusion layer;

wherein the sensing layer transmits an electrical signal indicative of the resultant magnitude to the communications module, and the communications module transmits the electrical signal to an external device.

18. The deformable apparatus of claim 17, wherein the deformable apparatus comprises a circular shape with a diameter ranging from 50 millimeters to 150 millimeters.

19. The deformable apparatus of claim 17, wherein the deformable apparatus comprises a rectangular shape with a surface area ranging from 35 millimeters to 150 millimeters.

* * * * *

UNITED STATES PATENT AND TRADEMARK OFFICE
CERTIFICATE OF CORRECTION

| | | |
|---|---|---|
| PATENT NO. | : 11,460,362 B2 | Page 1 of 1 |
| APPLICATION NO. | : 16/519594 | |
| DATED | : October 4, 2022 | |
| INVENTOR(S) | : Caleb M. Rogers, Benjamin D. Atkinson and Tyler Flood | |

It is certified that error appears in the above-identified patent and that said Letters Patent is hereby corrected as shown below:

On the Title Page

Column 2, item (56), other publications, cite no. 1, after "Licensing;", insert --Docket Number: S18-419--.

In the Specification

In Column 7, Line(s) 53, delete "Wi-Fi'" and insert --Wi-Fi™--, therefor.

Signed and Sealed this
Twenty-second Day of November, 2022

*Katherine Kelly Vidal*

Katherine Kelly Vidal
*Director of the United States Patent and Trademark Office*